US011909746B2

(12) United States Patent
Jasleen et al.

(10) Patent No.: US 11,909,746 B2
(45) Date of Patent: Feb. 20, 2024

(54) MULTI-PATH USER AUTHENTICATION AND THREAT DETECTION SYSTEM AND RELATED METHODS

(71) Applicant: DELL PRODUCTS L.P., Round Rock, TX (US)

(72) Inventors: Fnu Jasleen, Austin, TX (US); Joseph P. Marquardt, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 488 days.

(21) Appl. No.: 17/167,582

(22) Filed: Feb. 4, 2021

(65) Prior Publication Data

US 2022/0247762 A1 Aug. 4, 2022

(51) Int. Cl.
*H04L 9/40* (2022.01)
*G06F 18/214* (2023.01)

(52) U.S. Cl.
CPC ........ *H04L 63/1416* (2013.01); *G06F 18/214* (2023.01); *H04L 63/0876* (2013.01); *H04L 63/1425* (2013.01); *H04L 63/20* (2013.01)

(58) Field of Classification Search
CPC ............... G06F 18/214; H04L 63/0876; H04L 63/1425; H04L 63/20; H04L 63/1416
USPC ......................................................... 726/22
See application file for complete search history.

(56) References Cited

U.S. PATENT DOCUMENTS

| | | | | |
|---|---|---|---|---|
| 2012/0144468 A1* | 6/2012 | Pratt | ..................... | H04L 9/3271 726/7 |
| 2012/0204235 A1* | 8/2012 | Jaudon | ................... | G06F 21/30 726/4 |
| 2014/0179273 A1* | 6/2014 | Kim | ..................... | H04W 4/025 455/411 |
| 2015/0229664 A1* | 8/2015 | Hawthorn | ........... | H04L 63/1433 726/25 |
| 2017/0140663 A1* | 5/2017 | Sadeh-Koniecpol | ........................ | G09B 19/0053 |
| 2017/0171047 A1* | 6/2017 | Freishtat | ................. | G06Q 30/01 |
| 2017/0244746 A1* | 8/2017 | Hawthorn | ........... | H04L 63/1408 |

(Continued)

OTHER PUBLICATIONS

AuthO, "Make Multi-Factor Authentication Frictionless", Printed from Internet Jan. 5, 2021, 7 pgs.

(Continued)

*Primary Examiner* — Teshome Hailu
(74) *Attorney, Agent, or Firm* — Egan, Enders & Huston LLP.

(57) ABSTRACT

Embodiments of systems and methods are provided to enhance network security by providing secure, multi-path user authentication, while also providing a more convenient login experience to the user. In the present disclosure, a cloud-based user authentication and threat detection system is provided with an artificial intelligence (AI) engine and a training dataset. Utilizing a cloud-based system enables the AI engine to collect data from multiple devices located within different physical locations or environments (such as, for example, the user's home and office). The collected data is stored within the training dataset and used to create a personalized user profile for each user. Each time a user initiates login to a system or network from a particular location, the AI engine collects data from multiple devices within that location and utilizes the user profile data previously stored within the training dataset to securely authenticate the user or detect potential security threats.

25 Claims, 4 Drawing Sheets

(56) References Cited

U.S. PATENT DOCUMENTS

2019/0205794 A1* 7/2019 Hsu .................... G06N 20/20
2019/0392122 A1* 12/2019 Foster ................ G06F 21/6245
2021/0141888 A1* 5/2021 Hires .................. H04L 9/3231
2021/0248215 A1* 8/2021 Prabhu ................ G06F 17/18

OTHER PUBLICATIONS

Auth API, "Authentication", Printed from Internet Jan. 5, 2021, 5 pgs.
Honor Lock, "Online Proctoring Made Easy", Built for Student by Students, 2020, 6 pgs.
Futurae Docs, "Which Authentication Options Are Available", Printed from Internet Jan. 5, 2021, 3 pgs.
Yamazaki et al., "Toward More Secure and Convenient User Authentication in Smart Device Era" Advanced Log Processing and Office Information Systems, vol. E100-D, No. 10, Oct. 2017, 8 pgs.
Duo, "Two-Factor Authentication (2FA) From Duo", Printed from Internet Jan. 5, 2021, 21 pgs.

* cited by examiner

MULTI-PATH USER AUTHENTICATION AND THREAT DETECTION SYSTEM AND RELATED METHODS

FIELD

This invention relates generally to network security, and more particularly, to systems and methods to authenticate users and detect threats to network security.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the prevalence of information handling systems in today's society, and the increased connectivity between such systems, comes a need to enhance security within information handling systems and between network connected systems, devices, services and resources. Without having security measures in place, there exists a potential for a unauthorized user or system to gain access to an IHS, network resources or services connected to the IHS, or to an application, website or service used by the IHS.

Network security is often implemented and supervised by IT personnel, which utilize anti-malware mechanisms and security policies having well-defined rules to detect potential threats to the network. Anti-malware mechanisms look for trojans, worms and viruses across the network. While such mechanisms can be used to detect known threats, they cannot be used to detect threats having undefined entry points. When creating security policies, IT personnel look for certain variables and behaviors that identify a situation as a threat, and manually update security policy rules when new threats are detected. However, attackers are aware of the security policies and variables being monitored by IT personnel, rending this method inadequate and obsolete.

Cyberattacks have become increasingly more common, making it difficult if not impossible for IT personnel to track all variables and detect all kinds of potential threats. For example, cyber criminals are now using artificial intelligence (AI) engines to attack networks by browsing through huge data sets to find unguarded points of entry into the network. AI engines are also being used by cyber criminals to imitate large cyberattacks, which may thoroughly engage the IT department and divert their attention away from the real attack (such as, for example, a simple phishing attack).

Network security can be improved, and cyberattacks can be mitigated, by securely authenticating users requesting access to the network. However, many organizations rely on a single factor of authentication, such as username and password, to authenticate users. This method is inadequate and can significantly compromise network security if log-in credentials are compromised or the user's device is lost. Although some organizations use multiple factors of authentication (e.g., two-factor authentication methods) to improve authentication accuracy and enhance network security, the requirement to input additional authentication data (e.g., a one-time passcode or security token) or access additional authentication applications (such as Guardian or DUO) is inconvenient and time consuming, since the user must undergo this process every time they attempt to log-in to the network.

SUMMARY OF THE INVENTION

The following description of various embodiments of systems and related methods is not to be construed in any way as limiting the subject matter of the appended claims.

Embodiments of systems and methods are provided herein to enhance network security by providing secure, multi-path user authentication, while also providing a more convenient login experience to the user. In the present disclosure, a cloud-based user authentication and threat detection system is provided with an artificial intelligence (AI) engine and a training dataset. Utilizing a cloud-based system enables the AI engine to collect data from multiple devices located within different physical locations or environments (such as, for example, the user's home and office). The collected data is stored within the training dataset and used to create a personalized user profile for each user. Each time a user initiates login to a system or network from a particular location, the AI engine collects data from multiple devices within that location and utilizes the user profile data previously stored within the training dataset to securely authenticate the user or detect potential security threats.

For example, when a user initiates login to a system or network from a particular location, the AI engine may collect data from the user's information handling system, trusted peripheral device(s) and/or device(s) linked to the user's trusted peripheral device(s) at the particular location, and may utilize the collected data and the user profile data previously stored within the training dataset to detect (or predict the probability of) user presence at the particular location. If the collected data and the user profile data can be used to detect user presence at the particular location with sufficiently high accuracy (e.g., prediction accuracy>80%), the user is authenticated and logged into the system or network. Additional authentication factor(s) may be used to authenticate the user only if user presence cannot be detected at the particular location with sufficient accuracy. In some embodiments, the user's most frequently used applications may be automatically opened upon successful authentication, thus providing a more convenient, almost seamless login experience to the user.

According to one embodiment, a user authentication and threat detection system is provided herein. The user authentication and threat detection system described herein may generally include an artificial intelligence (AI) engine and a training dataset. The AI engine may include a plurality of software modules, which are stored within a computer-readable medium and executed by a processing device of a first cloud-based information handling system (IHS) to perform the user authentication and threat detection techniques described herein. The training dataset may be stored within the first cloud-based IHS, or within a second cloud-based IHS communicatively coupled to the first cloud-based IHS.

In general, the plurality of software modules may be executed to collect data from multiple devices located within different locations, store the collected data within the training dataset as user profile data, and securely authenticate the user or detect potential security threats to the protected network based, at least in part, on the user profile data stored within the training dataset. The collected data may generally include system and user-related data, which is collected from: (a) a first set of devices located at a first location when a user initiates login to a protected network from the first location; and (b) a second set of devices located at a second location, which differs from the first location, when the user initiates login to the protected network from the second location.

In some embodiments, the plurality of software modules may include a data collection module, a new device detection module, a user authentication and threat detection module, and an accuracy module. The data collection module, new device detection module, user authentication and threat detection module, and accuracy module may be executed by the processing device each time the user initiates login to the protected network from an IHS located at a particular location.

For example, the data collection module may be executed by the processing device to: collect data from the IHS and one or more trusted devices located within the particular location, and add the collected data to the user profile data stored within the training dataset. The one or more trusted devices may include at least one trusted peripheral device and/or one or more devices, which are linked to the at least one trusted peripheral device. In some embodiments, the at least one trusted peripheral device may be selected from a group comprising a laptop computer, a tablet computer, a security camera, and a smart device. In some embodiments, the one or more devices linked to the at least one trusted peripheral device is a smart device.

The new device detection module may be executed by the processing device to: detect a new device located within the particular location. In a new device is detected within the particular location, the new device detection module may to executed by the processing device to establish trust between the IHS and the new device by exchanging a token between the IHS and the new device, and add the new device as a trusted device, if the token exchange is successful, so that the data collection module can begin collecting data from the new device and adding the collected data to the user profile data.

The user authentication and threat detection module may be executed by the processing device to: attempt to detect an identity or presence of the user at the particular location based on the user profile data stored within the training dataset and the data, which was collected from the IHS and the one or more trusted devices located within the particular location when the user initiated login. In some embodiments, the user authentication and threat detection module may: (a) authenticate the user and grant access to the protected network, if the identity or presence of the user is detected at the particular location, or (b) deny the user access to the protected network, if the identity or presence of the user is not detected at the particular location.

In other embodiments, the user authentication and threat detection module may perform additional steps if the identity or presence of the user is not detected at the particular location. For example, the user authentication and threat detection module may attempt to authenticate the user via one or more additional authentication methods or factors before granting or denying user access to the protected network. In some cases, the user authentication and threat detection module may grant the user access to the protected network, if the one or more additional authentication methods or factors successfully authenticate the user. On the other hand, the user authentication and threat detection module may deny the user access to the protected network, if the one or more additional authentication methods or factors fail to authenticate the user.

The accuracy module may be executed by the processing device to determine a prediction accuracy or probability that the user is physically present at the particular location. In some embodiments, the user authentication and threat detection module may use the prediction accuracy provided by the accuracy module to authenticate the user. For example, the user authentication and threat detection module may: (a) authenticate the user and grant access to the protected network, if the prediction accuracy is greater than a predetermined prediction threshold; (b) attempt to authenticate the user via one or more additional authentication methods or factors, if the prediction accuracy is less than the predetermined accuracy threshold; and (c) deny the user access to the protected network, if the prediction accuracy is less than the predetermined accuracy threshold and the one or more additional authentication methods or factors fail to authenticate the user. In some embodiments, the user authentication and threat detection module may also use the prediction accuracy provided by the accuracy module to detect security threats. For example, the user authentication and threat detection module may detect a security threat to the protected network, if the prediction accuracy is less than the predetermined accuracy threshold and the one or more additional authentication methods or factors fail to authenticate the user.

According to another embodiment, a computer implemented method is provided herein for performing secure user authentication and threat detection. The computer implemented method described herein may generally include: (a) receiving a notification of user login from an information handling system (IHS) located at a first location when a user initiates login to a protected network from the IHS; (b) collecting data from the IHS and one or more trusted devices located within the first location, wherein the collected data comprises system and user-related data; (c) adding the collected data to user profile data previously stored within a training dataset; and (d) using the collected data and the user profile data previously stored within the training dataset to securely authenticate the user or detect potential security threats to the protected network. In some embodiments, the user profile data previously stored within the training dataset may include system and user-related data previously collected from an IHS and one or more trusted devices located within a second location.

After receiving the notification of user login, the computer implemented method described herein may further include detecting a new device located within the first location, and establishing trust between the IHS and the new device by exchanging a token between the IHS and the new device. If the token exchange is successful, the computer-implemented method may further include adding the new device as a new trusted device, collecting data from the new trusted device, and adding the data collected from the new trusted device to the user profile data.

In some embodiments of the computer implemented method described, the collected data and the user profile data previously stored within the training dataset may be used to determine if the user's login behavior is normal, and detect if at least one trusted device of the one or more trusted devices is in range of the IHS. If the user's login behavior is normal and the at least one trusted device is in range of the IHS, the computer implemented method described herein may further include authenticating the user, logging the user into the protected network, and in some embodiments, opening one or more of the user's frequently used applications.

If the user's login behavior is abnormal, or the at least trusted device is not in range of the IHS, the computer implemented method described herein may determine if the collected data and the user profile data can be used to detect user presence at the first location with an accuracy greater than a predetermined accuracy threshold. If user presence is detected at the first location with an accuracy greater than the predetermined accuracy threshold, the computer implemented method described herein may further include authenticating the user, logging the user into the protected network, and in some embodiments, opening one or more of the user's frequently used applications.

If user presence is detected at the first location with an accuracy less than the predetermined accuracy threshold, the computer implemented method described herein may further include: (a) determining user authentication via one or more additional authentication methods or factors; (b) granting the user access to the protected network, if the one or more additional authentication methods or factors successfully authenticate the user; and (c) denying the user access to the protected network, if the one or more additional authentication methods or factors fail to authenticate the user. If the one or more additional authentication methods or factors successfully authenticate the user, the computer implemented method may further include logging the user into the protected network, and in some embodiments, opening one or more of the user's frequently used applications.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Embodiments of systems and methods are provided herein to enhance network security by providing secure, multi-path user authentication, while also providing a more convenient login experience to the user. In the present disclosure, a cloud-based user authentication and threat detection system is provided with an artificial intelligence (AI) engine and a training dataset. Utilizing a cloud-based system enables the AI engine to collect data from multiple devices located within different physical locations or environments (such as, for example, the user's home and office). The collected data is stored within the training dataset and used to create a personalized user profile for each user. Each time a user initiates login to a system or network from a particular location, the AI engine collects data from multiple devices within that location and utilizes the user profile data previously stored within the training dataset to securely authenticate the user or detect potential security threats.

For example, when a user initiates login to a system or network from a particular location, the AI engine may collect data from the user's information handling system, trusted peripheral device(s) and/or device(s) linked to the user's trusted peripheral device(s) at the particular location, and may utilize the collected data and the user profile data previously stored within the training dataset to detect (or predict the probability of) user presence at the particular location. If the collected data and the user profile data can be used to detect user presence at the particular location with sufficiently high accuracy (e.g., prediction accuracy>80%), the user is authenticated and logged into the system or network. Additional authentication factor(s) may be used to authenticate the user only if user presence cannot be detected at the particular location with sufficient accuracy. In some embodiments, the user's most frequently used applications may be automatically opened upon successful authentication, thus providing a more convenient, almost seamless login experience to the user.

As described in more detail below, the present disclosure enhances network security by providing secure, multi-path user authentication and convenient login based on user profile data and prediction accuracy. The AI engine disclosed herein provides secure, multi-path user authentication by utilizing the user profile data collected from multiple devices at different locations (such as, for example, the user's home and office) to identify user presence at a particular location (such as, for example, the user's home). By using the user profile data to identify user presence, the AI engine enhances both network security and user convenience without requiring additional user intervention or input, unless prediction accuracy is low (e.g., <80%). Each time a user logs on from a particular location, data collected from the trusted devices within that location is fed back to the training dataset to create a more personalized user profile, thus providing a self-improving AI engine where prediction accuracy increases over time. As new devices are detected within the user's home, work or another environment, and trust is established, data collected from the newly trusted devices is fed back to the training dataset. In some cases, the data collected from the newly trusted devices may add new variables to the training dataset, resulting in a dynamically changing user profile.

In addition to providing secure, multi-path user authentication and convenient user login, the AI engine described herein may use the training dataset to identify any unusual activity on the network, thus further improving network security. For example, the AI engine can monitor a plethora of variables stored within the training dataset, and is constantly looking for and collecting data from newly trusted devices, which is added to the training dataset. By starting with a malicious attack database, which includes all parameters that cause known attacks, and feeding the data added to the training dataset into a machine learning (ML) model, other attacks and security threats can be predicted by the AI engine/ML model. This enables the AI engine to identify new types of malware and security threats, in addition to detecting known cyberattacks, and further enables the AI engine to detect AI related threats (such as, e.g., bitcoin mining, remote file execution and brute force login). The AI engine described herein can also be trained to remove noise or unwanted data, which may enable IT personnel to clearly understand the cyber environment and detect abnormal network activity. In this manner, the present disclosure provides a self-adapting and self-learning system and method that provides holistic security to combat sophisticated cyberattacks.

Figure 1:
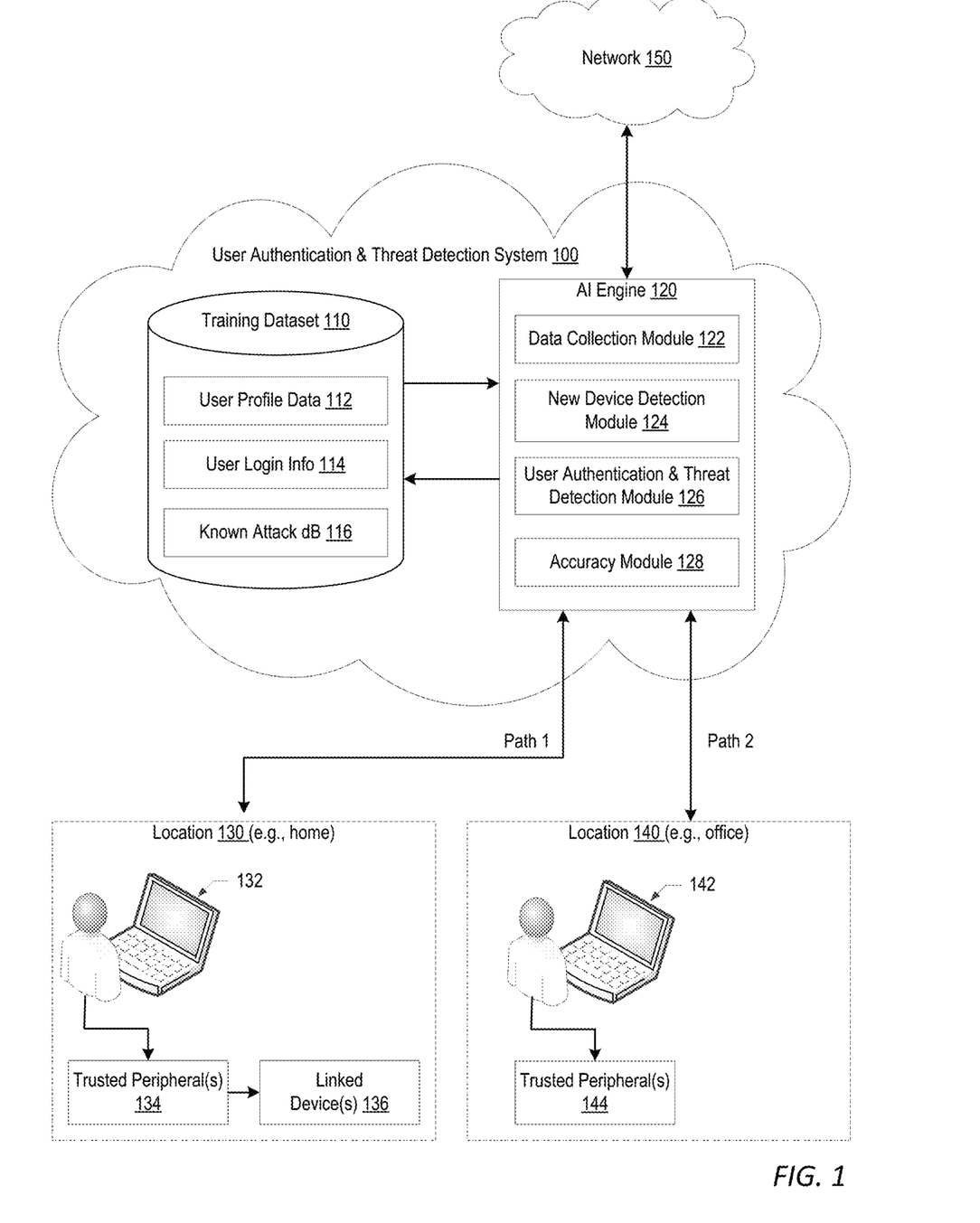
FIG. 1 is a block diagram illustrating one embodiment of a multi-path user authentication and threat detection system in accordance with the present disclosure.
Figure 2:
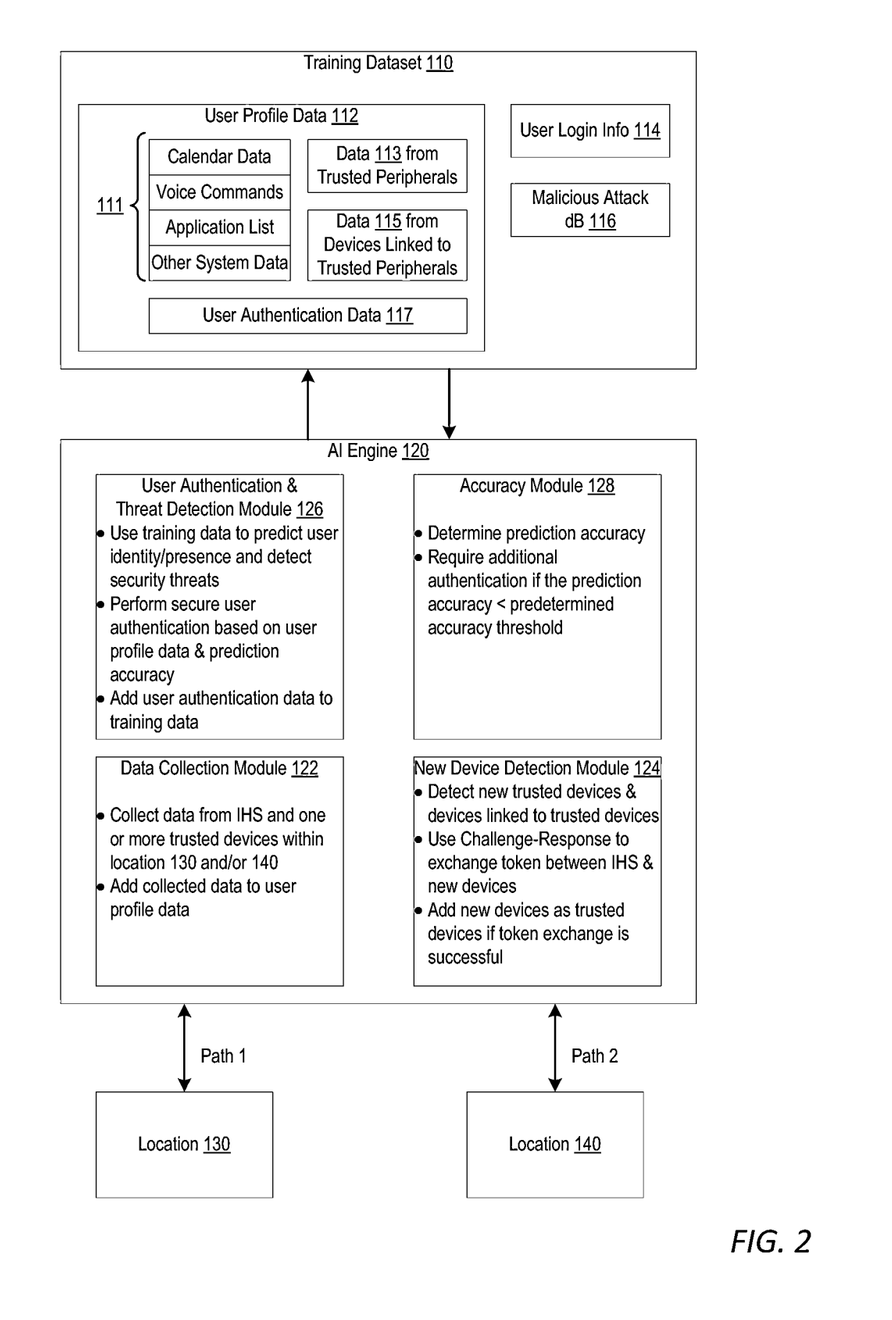
FIG. 2 is a block diagram illustrating additional details for the multi-path user authentication and threat detection system shown in FIG. 1.

Turning now to the drawings, FIGS. 1-2 illustrate one embodiment of a cloud-based user authentication and threat detection system 100 in accordance with the present disclosure. As shown in FIGS. 1 and 2, user authentication and threat detection system 100 includes a training dataset 110 and artificial intelligence (AI) engine 120. The training dataset 110 stores data, which is used by the AI engine 120 to perform the user authentication and threat detection techniques described herein. For example, the training dataset 110 may include user profile data 112, user login information 114 and a database 116 of parameters and known malicious attacks (otherwise referred to herein as the malicious attack database 116).

The user profile data 112 stored within the training dataset 110 may include a wide variety of system and user related data, which is collected from the user's system, trusted peripheral device(s) and/or device(s) linked to the user's trusted peripheral device(s) at one or more locations, such as but not limited to the user's home (location 130) and/or office (location 140). Examples of user profile data 112 are provided in more detail below.

The user login information 114 stored within the training dataset 110 may include a wide variety of user login credentials, which are used to login or gain access to an information handling system (e.g., IHS 132 or IHS 142) or network (e.g., protected network 150). Examples of user login information 114 include, but are not limited to, a username and password, a personal identification number (PIN), a security token, a security badge or wristband, a biometric identifier (e.g., a fingerprint, retinal scan, facial recognition, or voice signature) etc. Other types of user login information 114 not specifically mentioned herein may also be stored within the training dataset 110.

The malicious attack database 116 stored within the training dataset 110 may include a wide variety of known security threats and parameters. Examples of known security threats include, but are not limited to, man-in-the-middle attacks, insider threats, brute force and dictionary network attacks, birthday attacks, eavesdropping attacks, password attacks, distributed denial-of-service (DDoS) attacks, cross site scripting, SQL injection, Trojan horses, drive-by attacks, ransomware, whale phishing attacks and spear phishing attacks. Other types of malicious attacks security threats not specifically mentioned herein may also be stored within the malicious attack database 116. In some embodiments, new malicious attacks and security threats may be added to the malicious attack database 116 as they are detected by the AI engine 120.

The AI engine 120 may generally include a plurality of software modules (each comprising computer program code or program instructions), which are stored within a computer-readable medium and executed by a processing device of an information handling system (IHS) to perform the user authentication and threat detection techniques described herein. For example, the AI engine 120 may include a data collection module 122, a new device detection module 124, a user authentication and threat detection module 126 and an accuracy module 128, as shown in FIGS. 1 and 2 and described in more detail below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, Internet of Things (IoT) device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of an information handling system may include one or more disk drives, one or more network ports for communicating with external devices as well as various input and output (I/O) devices, such as a keyboard, a mouse, touch screen and/or a video display. An information handling system may also include one or more buses operable to transmit communications between the various hardware components.

In one embodiment, AI engine 120 and training dataset 110 may be implemented within one or more cloud-based information handling systems, such as one or more application servers and/or database servers. In some embodiments, the AI engine 120 and the training dataset 110 may be implemented within the same cloud-based system. In other embodiments, the AI engine 120 may be implemented within a first cloud-based system and the training dataset 110 may be implemented within a second cloud-based system communicatively coupled to the first cloud-based system.

As shown in FIG. 1, the AI engine 120 may communicate with other information handling systems (e.g., IHS 132 and 142), trusted peripheral devices (e.g., trusted peripherals 134 and 144) and other devices linked to trusted peripheral devices (e.g., linked devices 136), which are located in different environments or locations (e.g., location 130 and 140), such as but not limited to, a user's home and office. When a user attempts to login to a protected network 150 (e.g., a corporate network, government network or another protected network) from a particular location, the AI engine 120 communicates with the user's system, trusted device(s) and/or linked device(s) within that location to collect information or data pertaining to the user, potentially detect new device(s) linked to the user's trusted device(s), authenticate (or deny access to) the user attempting to login to the network and detect threats to network security.

The AI engine 120 may be configured to communicate with the information handling systems 132/142, trusted peripheral devices 134/144 and linked devices 136 shown in FIG. 1 over one or more networks using one or more communication protocols. Such network(s) may generally include local area networks (LANs), wide area networks (WANs), personal area networks (PANs), and/or the like. In some embodiments, AI engine 120 may utilize different networks to communicate with different systems and devices. For example, when the user attempts to access protected network 150 from home, AI engine 120 may utilize a wide area network (such as the Internet and/or a cellular network) and a personal area network (such as Wi-Fi) to communicate with IHS 132, trusted peripheral device(s) 134 and/or linked device(s) 136. When the user attempts to access protected network 150 from the office, AI engine 120 may utilize a wide area network (such as the Internet and/or cellular network) and a local intranet to communicate with IHS 142 and trusted peripherals 144.

As noted above, AI engine 120 includes a plurality of software modules, which may be executed to perform the user authentication and threat detection techniques described herein. As shown in FIGS. 1 and 2, AI engine 120 includes a data collection module 122, a new device detection module 124, a user authentication and threat detection module 126 and an accuracy module 128. The software modules included within AI engine 120 are preferably implemented as a cloud-based application service to enable secure, multi-path authentication and threat detection.

The software modules included within AI engine 120 may be executed whenever a user initiates login to a protected network, such as protected network 150. In some embodiments, a user may initiate login to protected network 150 by providing user log-in information (or user login credentials) to an IHS, such as IHS 132 or IHS 142. Examples of user login information include, but are not limited to, a username and password, a personal identification number (PIN), a security token, a security badge or wristband, a biometric identifier (such as, e.g., a fingerprint, retinal scan, facial recognition, or voice signature), etc. It is recognized that types of user login information may also be provided or used to initiate login to the protected network.

It is further recognized that a user may not need to provide user login information to initiate login to the protected network, in all embodiments of the present disclosure. Once enough user profile data 112 has been collected for a user and stored within the training data 110 to enable the AI engine 120 to accurately identify the user and/or detect user presence at an IHS, the user may initiate login to the protected network 150 by performing other actions, such as but not limited to, powering on the IHS, transitioning the IHS from a reduced power state to a wake state, providing a voice command to the IHS (e.g., "Login to network X") or any of a wide variety of actions that may be performed by a user physically present at the IHS.

When a user initiates login to protected network 150 from a first location (e.g., location 130), data collection module 122 collects data from the information handling system (e.g., IHS 132), trusted peripheral device(s) (e.g., trusted peripherals 134) and/or linked device(s) (e.g., linked devices 136) provided within the first location. The data collected by the data collection module 122 from the first location is stored within training dataset 110 as user profile data 112. If the user moves to a second location (e.g., location 140) and initiates login to the protected network 150, data collection module 122 collects data from the information handling system (e.g., IHS 142), trusted peripheral device(s) (e.g., trusted peripherals 144) and/or linked device(s) provided within the second location. The data collected by the data collection module 122 from the second location is added to the user profile data 112 stored within training dataset 110.

As shown in FIG. 2, user profile data 112 may generally include system data 111 collected from the user's information handling systems (e.g., IHS 132 and 142), data 113 collected from the user's trusted peripheral devices (e.g., trusted peripherals 134 and 144), and data 115 collected from devices linked to the user's trusted peripheral devices (e.g., linked devices 136). In some embodiments, user authentication data 117 may be added to the user profile data 112 each time a network user is authenticated or denied access to the protected network 150, as described in more detail below.

System data 111 may include, but is not limited to, calendar data (e.g., general work hours, scheduled meetings, etc.), voice commands (e.g., Cortana and/or Windows Hello voice commands), a list of the user's most frequently used applications, and other system data (e.g., IP address). Other types of system data 111 may also be collected from IHS 132 and IHS 142 and stored within the user profile data 112.

A variety of trusted peripheral devices 134 and 144 may be located within the user's home and/or office environment. Examples of trusted peripheral devices 134 and 144 include, but are not limited to, a laptop computer, a tablet computer, a security camera, a smart docking station, a smart monitor, a smart phone, a smart watch, a smart band, a smart home assistant (e.g., Amazon Alexa, Google Home, etc.), a smart doorbell, a smart tv, a smart home appliance, a smart home automation device, and other smart devices. As known in the art, a smart device is an electronic device, generally connected to other devices or networks via one or more wireless communication protocols (e.g., Bluetooth, Zigbee, NFC, Wi-Fi, cellular, etc.) that can operate to some extent interactively and autonomously. A smart device may also include one or more sensors for collecting various forms of data. Examples of data 113 that may be collected from trusted peripheral devices 134 and 144 include, but are not limited to, the signal strength of a cellular signal emitted from a trusted peripheral device, audio signals (e.g., voice signatures, voice commands, footstep data, ambient noise data, etc.) and/or video signals (e.g., a live video feed or recording) obtained by a trusted peripheral device, etc. Other data 113 may also be collected from trusted peripheral devices 134 and 144 and stored within the user profile data 112.

In some embodiments, one or more devices 136 within the user's home environment may be linked to at least one of the user's trusted peripheral devices 134. For example, smart home assistant devices (such as, e.g., Amazon Echo and Google Home smart speakers, displays, etc.) are one example of linked devices 136 that may be located within the user's home. Home assistant devices are typically linked to the user's smart phone, and thus, may be considered trusted devices once successfully authenticated through a challenge-response mechanism disclosed below. Linked devices 136 are not strictly limited to home assistant devices and may include other smart devices. Examples of data 115 that may be collected from linked devices 136 include, but are not limited to, the signal strength of a cellular signal emitted from a linked device, audio signals (e.g., voice signatures, voice commands, footstep data, ambient noise data, etc.) and/or video signals (e.g., a live video feed or recording) obtained by the linked device. Other data 115 may also be collected from linked devices 136 and stored within the user profile data 112.

Each time a user initiates login to protected network 150 from a particular location, the data collected by the data collection module 122 from the information handling system, trusted peripheral device(s) and/or linked device(s) within that location is fed back to the training dataset 110 and used to improve the user profile data 112. Collecting data from multiple locations, each comprising potentially different systems, trusted devices and/or linked devices, enables a broad set of user profile data 112 to be collected and stored for each network user. This enables the user profile data 112 stored within the training dataset 110 to provide a unique user profile for each network user, which can be used to authenticate the user and detect network security threats. An even more personalized user profile is created as more data is collected over time (and/or from additional devices) and fed back to the user profile data 112. This increases authentication accuracy and network security over time.

New device detection module 124 monitors the user's environment to detect new trusted peripheral devices and/or new devices linked to at least one of the user's trusted peripheral devices. For example, new device detection module 124 may detect a new linked device 136 (such as an Amazon Alexa device or another home assistant device), which was added to the user's home environment and linked to the user's cell phone. When a new linked device 136 is detected, the new device detection module 124 exchanges a token between the user's system and the new linked device to ensure physical proximity of the new linked device, establish trust between the user's system and the new linked device and prevent man-in-the-middle attacks. If the token exchange is successful, new device detection module 124 may add the new linked device 136 as a trusted device. Once trust is established, data collection module 122 may begin collecting data from the new linked device 136.

User authentication and threat detection module 126 utilizes training dataset 110 to make predictions on user identity/presence and detect security threats. For example, when a user physically located at a first location (e.g., location 130) initiates login to protected network 150, the user authentication and threat detection module 126 may use artificial intelligence (or machine learning) to extract features from the training dataset 110, which can be used to determine that the user requesting access to the protected network 150 is physically present at the first location and is who he/she claims to be.

Accuracy module 128 determines the prediction accuracy, or the probability that the user requesting access to protected network 150 is physically present at the first location and is who he/she claims to be. In some embodiments, the user authentication and threat detection module 126 may detect user identity/presence at the first location if the prediction accuracy is greater than a predetermined accuracy threshold. In one embodiment, the predetermined accuracy threshold may be, for example, 0.80 or 80%. However, other accuracy threshold values may also be used.

The user may be authenticated and granted access to the protected network 150 if the prediction accuracy provided by the accuracy module 128 is greater than the predetermined accuracy threshold (e.g., >0.80). However, if the prediction accuracy is less than the predetermined accuracy threshold (e.g., <0.80), the user authentication and threat detection module 126 may attempt to authenticate the user via one or more additional authentication methods or factors. For example, the user authentication and threat detection module 126 may require the user to input additional authentication data (e.g., a one-time passcode, a security token, biometric data, etc.) or access an additional authentication application (such as Guardian or DUO) to authenticate the user and detect user identity/presence. Other authentication methods or factors not specifically mentioned herein may also be used. The user may be denied access to the protected network 150 if the prediction accuracy provided by the accuracy module 128 is less than the predetermined accuracy threshold (e.g., <0.80) and the additional authentication methods or factors fail to authenticate the user and detect user identity/presence.

In some embodiments, the user authentication and threat detection module 126 may detect and/or identify a security threat to the protected network 150, if the prediction accuracy provided by the accuracy module 128 is less than the predetermined accuracy threshold (e.g., <0.80) and the additional authentication methods or factors fail to detect user identity/presence. For example, if user identity/presence cannot be detected, AI engine 120 may use the user profile data 112, which was collected by the data collection module 122 and stored within the training dataset 110 to detect potentially new malicious attacks and security threats. If detected, AI engine 120 may add the newly detected malicious attacks and security threats to the malicious attack database 116 as they are detected.

In some embodiments, the user authentication and threat detection module 126 may add authentication related data to the user authentication data 117 stored within the user profile data 112 each time the network user attempts to access the protected network 150 and the module 126 is executed. For example, the user authentication and threat detection module 126 may store the prediction accuracy, the user authentication status (e.g., access granted or denied), the user data corresponding to the one or more additional authentication methods or factors and/or the detected security threats within the user authentication data 117.

Figure 3:
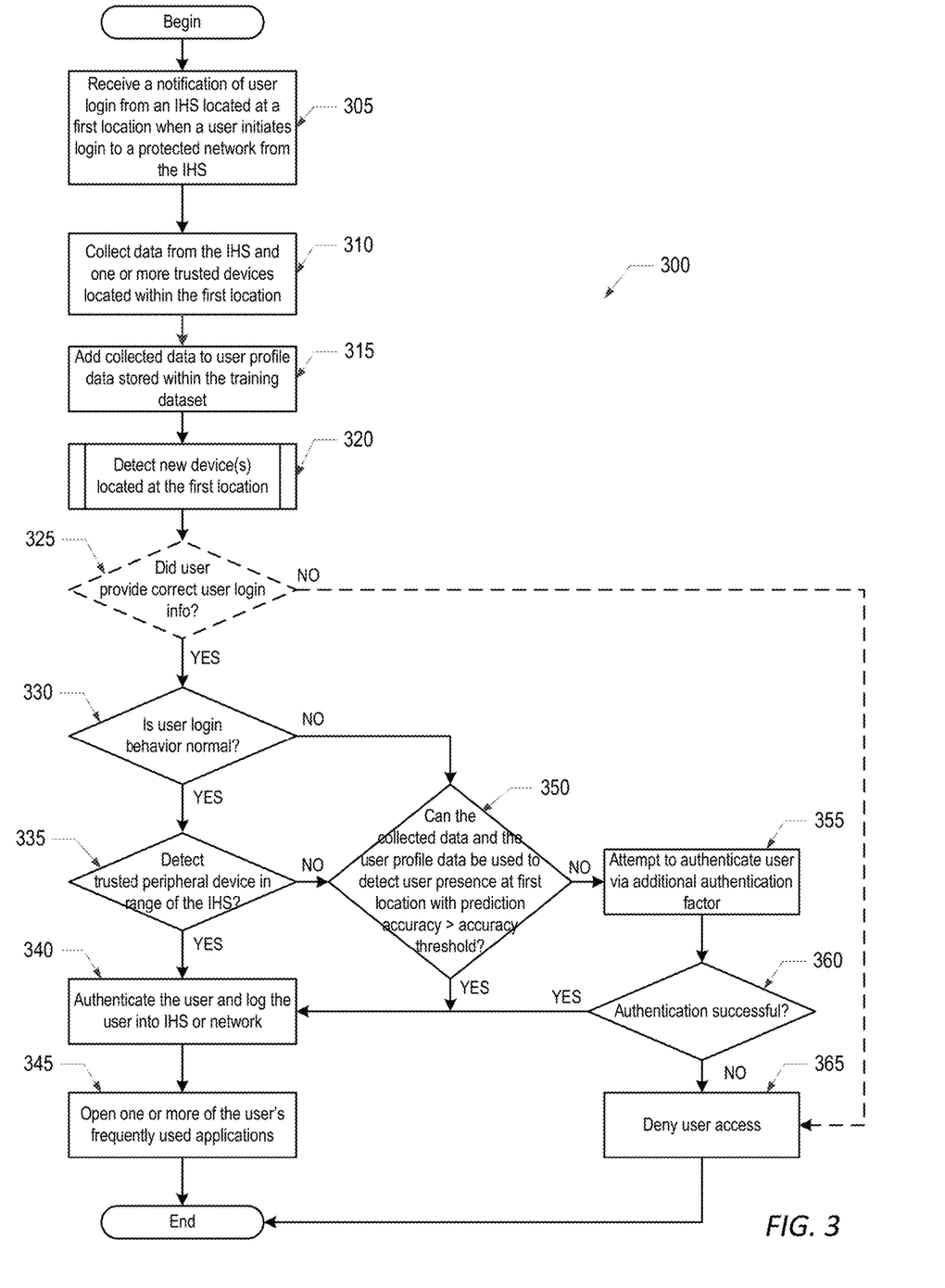
FIG. 3 is a flowchart diagram illustrating one embodiment of a method to provide secure, multi-path user authentication when a user initiates login to a protected network.

The user authentication and threat detection module 126 shown in FIGS. 1 and 2 performs secure, multi-path user authentication and threat detection based on the data collected by the data collection module 120 upon user login, the user profile data 112, user login information 114 and malicious attack database 116 previously stored within the training dataset 110, and the prediction accuracy provided by the accuracy module 128. FIG. 3 illustrates an exemplary method that may be performed by the user authentication and threat detection module 126 to authenticate network users and detect security threats. Each time a network user is authenticated or denied access to protected network 150, the user authentication and threat detection module 126 may add authentication related data to the user authentication data 117 stored within the user profile data 112 to further improve the personalized user profile.

FIG. 3 illustrates one embodiment of a method 300 that may be used to provide secure, multi-path user authentication when a user initiates login to a protected network. More specifically, method 300 is a computer implemented method performed, at least in part, by a processing device of an information handling system (e.g., a cloud-based server) executing program instructions stored within a computer readable storage device, such as but not limited to, program instructions contained within data collection module 122, new device detection module 124, user authentication and threat detection module 126 and/or accuracy module 128.

As shown in FIG. 3, method 300 begins upon receiving a notification of user log-in from an IHS (e.g., IHS 132 or 142) located at a first location when a user initiates login to a protected network (e.g., protected network 150) from the IHS (in step 305). Although not restricted to such, the first location may be, for example, the user's home (e.g., location 130) or office (e.g., location 140). In some embodiments, the notification of user log-in received in step 305 may comprise user login information, which was provided by the user to initiate login. Examples of user login information include, but are not limited to, a username and password, a personal identification number (PIN), a security token, a security badge or wristband, and a biometric identifier (such as, e.g., a fingerprint, retinal scan, facial recognition, or voice signature, etc.). It is recognized that other types of user log-in information may be provided or used to initiate login to the protected network in step 305. It is further recognized that it may not be necessary for the user to provide user log-in information to initiate login to the protected network, as set forth in more detail above. In such embodiments, the notification of user login received in step 305 may not include user login information.

After a notification of user login is received (in step 305), method 300 collects data from the IHS and one or more trusted devices located within the first location (in step 310), and adds the collected data to the user profile data 112 stored within the training dataset 110 (in step 315). The one or more trusted devices may generally include trusted peripheral devices (e.g., trusted peripheral devices 134) and/or devices, which are linked to the trusted peripheral devices (e.g., linked devices 136). Examples of trusted peripheral devices include, but are not limited to, a laptop computer, a tablet computer, a security camera, a smart docking station, a smart phone, a smart watch, a smart home assistant (e.g., Amazon Alexa, Google Home, etc.), a smart monitor, a smart tv, and other smart devices and Internet of Things (IoT) devices. Examples of linked devices include, but are not limited to, smart home assistants and other smart devices and IoT devices. Examples of data collected in step 310 and added to the user profile data in step 315 include, but are not limited to, system data 111 (e.g., calendar data, voice commands, a list of the user's most frequently used applications, IP address, etc.), data 113 collected from trusted peripheral devices (e.g., the signal strength of a cellular signal emitted from the trusted peripheral device, voice signatures, voice commands, footstep data, ambient noise data, a live video feed or video recording, etc.) and data 115 collected from linked devices (e.g., the signal strength of a cellular signal emitted from the trusted peripheral device, voice signatures, voice commands, footstep data, ambient noise data, a live video feed or video recording, etc.).

Figure 4:
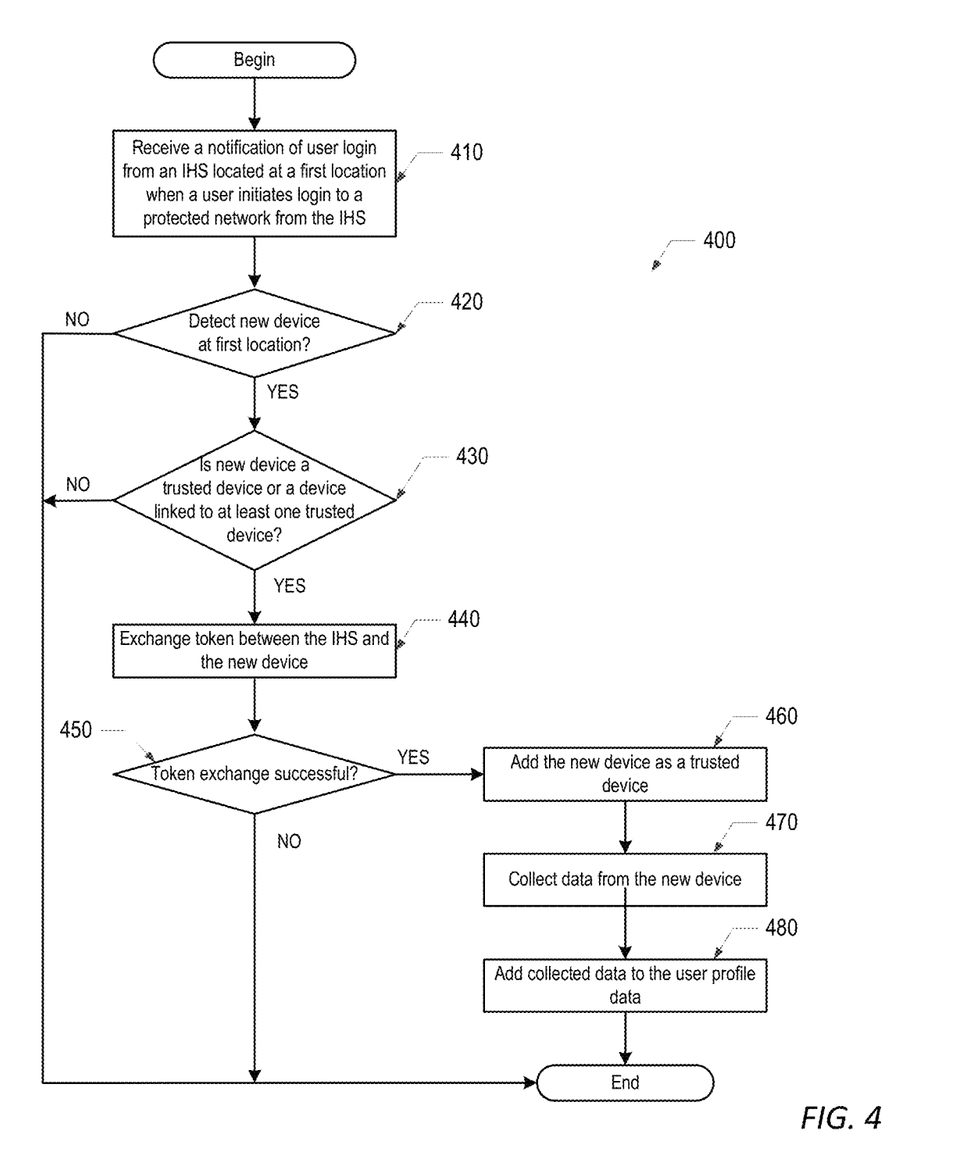
FIG. 4 is a flowchart diagram illustrating one embodiment of a method to detect new devices located when a user initiates login to a protected network.

Next, method 300 may detect new devices located at the first location (in step 320). One embodiment of a method 400 for detecting new devices located within a first location when a user initiates login to a protected network from the first location is shown in FIG. 4 and described in more detail below. It is recognized, however, that alternative methods for detecting new devices may also be used in step 320.

As noted above, the notification of user login received in step 305 may, in some embodiments, include user login information, which was provided by the user to initiate login. In such embodiments, method 300 may determine if the user provided the correct user login information when initiating login to the protected network (in optional step 325). If the user failed to provide the correct user login information (NO branch in optional step 325), user access is denied (in step 365) and the method 300 ends. If the user provided the correct user login information (YES branch in optional step 325), or if user log-in information is not required, the method 300 proceeds to step 330.

In step 330, method 300 determines if the user login behavior is normal. Examples of normal user login behavior include, but are not limited to, a user initiating login: (a) during normal work hours and/or previously scheduled meeting times, (b) from the user's home or usual office location, (c) from a system registered to or assigned to the user, etc. In one example implementation, method 300 may compare the user's login time to calendar data stored within the user profile data 112 to determine if the user is attempting to log-in during the user's normal work hours and/or during a previously scheduled meeting time.

If the user's login behavior is normal (e.g., if the user's login time is within normal work hours and/or scheduled meeting times) (YES branch of step 330), method 300 detects whether or not a trusted peripheral device is in range of the IHS (in step 335). In one example implementation, method 300 may use the signal strength of a cellular signal emitted from the user's cell phone (i.e., a trusted peripheral device) to determine whether or not the user's cell phone is in range of the IHS in step 335. If method 300 determines that the user's trusted peripheral device is in range of the IHS (YES branch of step 335), method 300 authenticates the user and logs the user into the IHS or protected network (in step 340) and automatically opens one or more of the user's frequently used applications (in step 345), so that the user can quickly and conveniently resume work.

If the user's login behavior is not normal (NO branch of step 330), or if a trusted peripheral device is not detected within range of the IHS (NO branch of step 335), method 300 proceeds to step 350. In step 350, method 300 determines if the data collected in step 310 and the user profile data 112 previously stored within the training dataset 110 can be used to detect user identity/presence at the first location with sufficiently high accuracy (in step 350). In some embodiments, method 300 may compare the data collected in step 310 to the user profile data 112 stored within the training dataset 110 to identify the user and determine if the user is physically present at the first location in step 350. In one example implementation, method step 350 may detect the user's presence at the first location if a voice signature or voice command captured by a trusted device in step 310 matches a voice signature or voice command stored within the user's personalized user profile data 112. In another example implementation, method step 350 may detect the user's presence at the first location if footstep data captured by a trusted device in step 310 matches the footstep data stored within the user's personalized user profile data 112.

In some embodiments, method 300 may use artificial intelligence (or machine learning) to predict user identity/presence at the first location in step 350. For example, an artificial intelligence engine (such as AI engine 120) may be used to extract features from the user profile data 112 stored within the training dataset 110, and may use the extracted features to determine the prediction accuracy, or probability that the user is physically present at the first location and is who he/she claims to be. In one example implementation, the AI engine may use extracted features, such as voice commands, voice signatures, facial recognition, location presence, peripheral device detection, etc. to predict user identity/presence at the first location. Other features may also be used to predict user identity/presence, depending on the data collected in step 310 and stored within the user profile data 112. If the prediction accuracy is greater than a predetermined accuracy threshold, such as but not limited to 80% (YES branch of step 350), method 300 may log the user into the IHS or protected network (in step 340) and automatically open the user's frequently used applications (in step 345), so that the user can quickly and conveniently resume work.

In some embodiments, method 300 may attempt to authenticate the user via additional authentication method(s) or factor(s) (in step 355) before granting or denying user access to the IHS or protected network. For example, additional authentication method(s) or factor(s) may be used to authenticate the user (in step 355) if: (a) the prediction accuracy is less than the predetermined accuracy threshold (NO branch of step 350), or (b) the user's login time is determined to be abnormal (e.g., outside of normal work hours and/or scheduled meeting times) in step 330. In one example implementation, method 300 may require the user to input additional authentication data (e.g., a one-time passcode, a security token, biometric data, etc.) or access an additional authentication application (such as Guardian or DUO) in step 355. If the additional authentication method(s) or factor(s) can be used to successfully authenticate the user (YES branch of step 360), method 300 may log the user into the IHS or protected network (in step 340) and automatically open the user's frequently used applications (in step 345). If the additional authentication method(s) or factor(s) cannot be used to successfully authenticate the user (NO branch of step 360), method 300 may deny user access (in step 365) and the method 300 may end.

FIG. 4 illustrates one embodiment of a method 400 that may be used to detect new devices located within a first location when a user initiates login to a protected network from the first location. In some embodiments, method 400 may be performed in step 320 of the method 300 shown in FIG. 3. However, method 400 may alternatively be performed at any time after a user initiates login to a protected network. Like the method 300 shown in FIG. 3, the method 400 shown in FIG. 4 is a computer implemented method performed, at least in part, by a processing device of an information handling system (e.g., a cloud-based server) executing program instructions stored within a computer readable storage device. In one embodiment, the executed program instructions may be contained within data collection module 122 and new device detection module 124.

As shown in FIG. 4, method 400 may generally begin upon, or substantially any time after, receiving a notification of user login from an IHS (e.g., IHS 132 or 142) located at a first location when a user initiates login to a protected network (e.g., protected network 150) from the IHS (in step 410). Although not restricted to such, the first location may be, for example, the user's home (e.g., location 130) or office (e.g., location 140). In some embodiments, the notification of user login received in step 410 may comprise user log-in information, which was provided by the user to initiate login. Examples of user log-in information include, but are not limited to, a username and password, a personal identification number (PIN), a security token, a security badge or wristband, and a biometric identifier (such as, e.g., a fingerprint, retinal scan, facial recognition, or voice signature, etc.). It is recognized that other types of user login information may be provided or used to initiate login to the protected network in step 405. It is further recognized that it may not be necessary for the user to provide user login information to initiate login to the protected network, as set forth in more detail above. In such embodiments, the notification of user login received in step 410 may not include user login information.

After a notification of user login is received (in step 410), method 400 determines if a new device is detected at the first location (in step 420). Method 400 may end if a new device is not detected (NO branch of step 420). However, if a new device is detected (YES branch of step 420), method 400 may determine if the new device detected in step 420 is a trusted device or a device linked to at least one of the user's trusted devices (in step 430). Method 400 may end if the new device detected in step 420 is not a trusted device or a device linked to at least one of the user's trusted devices (NO branch of step 430).

If method 400 determines that the new device is a trusted device or a device linked to at least one of the user's trusted devices (YES branch of step 430), method 400 may exchange a token between the IHS and the new device (in step 440) to ensure physical proximity of the new device and prevent man-in-the-middle attacks. Method 400 may end if the token exchange is not successful (NO branch of step 450). If the token exchange is successful (YES branch of step 450), method 400 adds the new device as a trusted device (in step 460), begins collecting data from the new device (in step 470) and adds the collected data to the user profile data 112 (in step 480).

Each time a user logs on from a particular location (such as, but not limited to, the user's home or office), data is collected from the IHS and the trusted devices within that location and fed back to the user profile data 112 to create a more personalized user profile. As new devices are detected within the user's home or work environment (in step 420), and trust is established (in steps 440-460), data collected from the newly trusted devices (in step 470) is also fed back to the user profile data 112 (in step 480). In some cases, the data collected from the newly trusted devices may add new variables to the user profile data 112, resulting in a dynamically changing user profile. Each time a user logs on from a different location (such as, for example, an alternative office location), data is again collected from the IHS and the trusted devices within that location and fed back to the user profile data 112 to further enhance the user profile.

Collecting data from multiple locations, each comprising potentially different IHS s, trusted devices and/or linked devices, enables a broad set of user profile data 112 to be collected and stored for each network user. The user profile data 112 provides a unique user profile for each network user, which can be used to authenticate the user and detect network security threats, as described above for example in reference to FIGS. 1-3. The user profile is continually updated and improved as more data is collected (e.g., over time and/or from new devices detected within the user's environment) and fed back to the user profile data 112. This increases authentication accuracy and network security over time.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A user authentication and threat detection system, comprising:
    an artificial intelligence (AI) engine comprising a plurality of software modules, which are stored within a computer-readable medium and executed by a processing device of a first cloud-based information handling system (IHS) to:
        collect data from multiple devices located within different locations, wherein the collected data comprises system and user-related data, which is:
            first collected from a first set of devices located at a first location when a user initiates login to a protected network from the first location; and
            then collected from a second set of devices located at a second location, which differs from the first location, when the user initiates log-in to the protected network from the second location;
        store the collected data within a training dataset as user profile data; and
        securely authenticate the user initiating login to the protected network from the second location or detect potential security threats to the protected network from the user initiating login to the protected network from the second location based, at least in part, on the user profile data comprising system and user-related data previously collected from the first location that is stored within the training dataset; and
    the training dataset, wherein the training dataset is stored within the first cloud-based IHS or a second cloud-based IHS communicatively coupled to the first cloud-based IHS;
    where the system and user-related data collected at each of the first and second locations comprises:
        system data collected from a respective IHS from which the user initiates login at each of the first and second locations,
        data collected from one or more respective trusted peripheral devices at each of the first and second locations, and
        data collected from one or more devices linked to the trusted peripheral devices at each of the first and second locations.

2. The user authentication and threat detection system as recited in claim 1, wherein the plurality of software modules comprise a data collection module, wherein each time the user initiates login to the protected network from an IHS located at a particular location, the data collection module is executed by the processing device to:
    collect data from the IHS and one or more trusted devices located within the particular location, wherein the one or more trusted devices comprise at least one of the trusted peripheral devices and the one or more devices linked to the at least one trusted peripheral device; and
    add the collected data to the user profile data stored within the training dataset.

3. The user authentication and threat detection system as recited in claim 2, wherein the at least one trusted peripheral device is selected from a group comprising a laptop computer, a tablet computer, a security camera, and a smart device.

4. The user authentication and threat detection system as recited in claim 2, wherein the one or more devices linked to the at least one trusted peripheral device is a smart device.

5. The user authentication and threat detection system as recited in claim 1, where the system data collected from the respective IHS from which the user initiates login at each of the first and second locations comprises at least one of calendar data, voice commands, or a list comprising one or more of the user's most frequently used applications.

6. The user authentication and threat detection system as recited in claim 1, where the data collected from each of the one or more respective trusted peripheral devices at each of the first and second locations comprises at least one of a signal strength of a cellular signal emitted from each of the one or more respective trusted peripheral devices, audio signals obtained by each of the one or more respective trusted peripheral devices, or video signals obtained by each of the one or more respective trusted peripheral devices.

7. The user authentication and threat detection system as recited in claim 1, where the data collected from each of the one or more devices linked to the trusted peripheral devices at each of the first and second locations comprises at least one of a signal strength of a cellular signal emitted from each of the one or more devices linked to the trusted peripheral devices, audio signals obtained by each of the one or more devices linked to the trusted peripheral devices, or video signals obtained by each of the one or more devices linked to the trusted peripheral devices.

8. A user authentication and threat detection system, comprising:
    an artificial intelligence (AI) engine comprising a plurality of software modules, which are stored within a computer-readable medium and executed by a processing device of a first cloud-based information handling system (IHS) to:
        collect data from multiple devices located within different locations, wherein the collected data comprises system and user-related data, which is collected from:
            a first set of devices located at a first location when a user initiates login to a protected network from the first location; and a second set of devices located at a second location, which differs from the first location, when the user initiates login to the protected network from the second location;

store the collected data within a training dataset as user profile data; and securely authenticate the user or detect potential security threats to the protected network based, at least in part, on the user profile data stored within the training dataset; and the training dataset, wherein the training dataset is stored within the first cloud-based IHS or a second cloud-based IHS communicatively coupled to the first cloud-based IHS;

wherein the plurality of software modules comprise a data collection module, wherein each time the user initiates login to the protected network from an IHS located at a particular location, the data collection module is executed by the processing device to:

collect data from the IHS and one or more trusted devices located within the particular location, wherein the one or more trusted devices comprise at least one trusted peripheral device and/or one or more devices linked to the at least one trusted peripheral device, and add the collected data to the user profile data stored within the training dataset; and wherein the plurality of software modules comprise a new device detection module, wherein each time the user initiates login to the protected network from an IHS located at a particular location, the new device detection module is executed by the processing device to:

detect a new device located within the particular location, establish trust between the IHS and the new device by exchanging a token between the IHS and the new device, and add the new device as a trusted device, if the token exchange is successful, so that the data collection module can begin collecting data from the new device and adding the collected data to the user profile data.

9. A user authentication and threat detection system, comprising:

an artificial intelligence (AI) engine comprising a plurality of software modules, which are stored within a computer-readable medium and executed by a processing device of a first cloud-based information handling system (IHS) to:

collect data from multiple devices located within different locations, wherein the collected data comprises system and user-related data, which is collected from:

a first set of devices located at a first location when a user initiates login to a protected network from the first location; and a second set of devices located at a second location, which differs from the first location, when the user initiates login to the protected network from the second location;

store the collected data within a training dataset as user profile data; and securely authenticate the user or detect potential security threats to the protected network based, at least in part, on the user profile data stored within the training dataset; and the training dataset, wherein the training dataset is stored within the first cloud-based IHS or a second cloud-based IHS communicatively coupled to the first cloud-based IHS;

wherein the plurality of software modules comprise a data collection module, wherein each time the user initiates login to the protected network from an IHS located at a particular location, the data collection module is executed by the processing device to:

collect data from the IHS and one or more trusted devices located within the particular location, wherein the one or more trusted devices comprise at least one trusted peripheral device and/or one or more devices linked to the at least one trusted peripheral device, and add the collected data to the user profile data stored within the training dataset; and wherein the plurality of software modules comprise a user authentication and threat detection module, wherein each time the user initiates login to the protected network from an IHS located at a particular location, the user authentication and threat detection module is executed by the processing device to:

attempt to detect an identity or presence of the user at the particular location based on the user profile data stored within the training dataset and the data, which was collected from the IHS and the one or more trusted devices located within the particular location when the user initiated log-in, authenticate the user and grant access to the protected network, if the identity or presence of the user is detected at the particular location, and deny the user access to the protected network, if the identity or presence of the user is not detected at the particular location.

10. The user authentication and threat detection system as recited in claim 9, wherein if the identity or presence of the user is not detected at the particular location, the user authentication and threat detection module is further executed by the processing device to:

attempt to authenticate the user via one or more additional authentication methods or factors before granting or denying user access to the protected network;

grant the user access to the protected network, if the one or more additional authentication methods or factors successfully authenticate the user; and deny the user access to the protected network, if the one or more additional authentication methods or factors fail to authenticate the user.

11. The user authentication and threat detection system as recited in claim 9, wherein the plurality of software modules further comprise an accuracy module, wherein each time the user initiates login to the protected network from an IHS located at a particular location, the accuracy module is executed by the processing device to:

determine a prediction accuracy or probability that the user is physically present at the particular location.

12. The user authentication and threat detection system as recited in claim 11, wherein the user authentication and threat detection module is further executed by the processing device to:

authenticate the user and grant access to the protected network, if the prediction accuracy is greater than a predetermined prediction threshold;

attempt to authenticate the user via one or more additional authentication methods or factors, if the prediction accuracy is less than the predetermined accuracy threshold; and deny the user access to the protected network, if the prediction accuracy is less than the predetermined accuracy threshold and the one or more additional authentication methods or factors fail to authenticate the user.

13. The user authentication and threat detection system as recited in claim 11, wherein the user authentication and threat detection module is further executed by the processing device to:

detect a security threat to the protected network, if the prediction accuracy is less than the predetermined accuracy threshold and the one or more additional authentication methods or factors fail to authenticate the user.

14. A computer implemented method, comprising:

first receiving a notification of user login from an information handling system (IHS) located at a first location when a user initiates login to a protected network from the IHS;

then collecting data from the IHS and one or more trusted devices located within the first location, wherein the collected data comprises system and user-related data;

then adding the collected data from the IHS and one or more trusted devices located within the first location to user profile data previously stored within a training dataset; and then using the collected data and the user profile data previously stored within the training dataset to securely authenticate the user or detect potential security threats to the protected network on the information handling system (IHS) located at the first location;

wherein the user profile data previously stored within the training dataset comprises system and user-related data previously collected from an IHS and one or more trusted devices located within a second location when the user previously initiated login to the protected network from the second location; and where the system and user-related data collected at each of the first and second locations comprises:

system data collected from a respective IHS from which the user initiates login at each of the first and second locations, data collected from one or more respective trusted peripheral devices at each of the first and second locations, and data collected from one or more devices linked to the trusted peripheral devices at each of the first and second locations.

15. The computer implemented method as recited in claim 14, where the system data collected from the respective IHS from which the user initiates login at each of the first and second locations comprises at least one of calendar data, voice commands, or a list comprising one or more of the user's most frequently used applications.

16. The computer implemented method as recited in claim 14, where the data collected from each of the one or more respective trusted peripheral devices at each of the first and second locations comprises at least one of a signal strength of a cellular signal emitted from each of the one or more respective trusted peripheral devices, audio signals obtained by each of the one or more respective trusted peripheral devices, or video signals obtained by each of the one or more respective trusted peripheral devices.

17. The computer implemented method as recited in claim 14, where the data collected from each of the one or more devices linked to the trusted peripheral devices at each of the first and second locations comprises at least one of a signal strength of a cellular signal emitted from each of the one or more devices linked to the trusted peripheral devices, audio signals obtained by each of the one or more devices linked to the trusted peripheral devices, or video signals obtained by each of the one or more devices linked to the trusted peripheral devices.

18. A computer implemented method, comprising:

receiving a notification of user login from an information handling system (IHS) located at a first location when a user initiates login to a protected network from the IHS;

collecting data from the IHS and one or more trusted devices located within the first location, wherein the collected data comprises system and user-related data;

adding the collected data to user profile data previously stored within a training dataset; and using the collected data and the user profile data previously stored within the training dataset to securely authenticate the user or detect potential security threats to the protected network;

where after receiving the notification of user login, the computer implemented method further comprises:

detecting a new device located within the first location, and establishing trust between the IHS located at the first location and the new device located at the first location by exchanging a token between the IHS located at the first location and the new device located at the first location to ensure physical proximity of the new linked device to the IHS; and wherein if the token exchange is successful, the computer-implemented method further comprises:

adding the new device as a new trusted device, collecting data from the new trusted device, and adding the data collected from the new trusted device to the user profile data.

19. A computer implemented method, comprising:

receiving a notification of user login from an information handling system (IHS) located at a first location when a user initiates login to a protected network from the IHS;

collecting data from the IHS and one or more trusted devices located within the first location, wherein the collected data comprises system and user-related data;

adding the collected data to user profile data previously stored within a training dataset; and using the collected data and the user profile data previously stored within the training dataset to securely authenticate the user or detect potential security threats to the protected network;

wherein said using the collected data and the user profile data previously stored within the training dataset to securely authenticate the user or detect potential security threats to the protected network comprises using the collected data and the user profile data to:

determine if the user's login behavior is normal, and detect if at least one trusted device of the one or more trusted devices is in range of the IHS located at the first location; and where the user's login behavior is determined to be normal if the user initiates the log-in from the IHS located at a first location during normal work hours of the user and/or during a previously scheduled meeting time, and where the user's log-in behavior is determined to be abnormal if the user initiates the login from the IHS located at a first location not during normal work hours of the user and/or not during a previously scheduled meeting time.

20. The computer implemented method as recited in claim 19, wherein if the user's login behavior is normal and the at least one trusted device is in range of the IHS, the computer implemented method further comprises:
   authenticating the user; and
   logging the user into the protected network.

21. The computer implemented method as recited in claim 19, wherein if the user's login behavior is abnormal, or the at least trusted device is not in range of the IHS, the computer implemented method further comprises:
   determining if the collected data and the user profile data can be used to detect user presence at the location of the IHS located at the first location with an accuracy greater than a predetermined accuracy threshold.

22. The computer implemented method as recited in claim 21, wherein if user presence is detected at the location of the IHS located at the first location with an accuracy greater than the predetermined accuracy threshold, the computer implemented method further comprises:
   authenticating the user; and
   logging the user into the protected network.

23. The computer implemented method as recited in claim 21, wherein if user presence is detected at the location of the IHS located at the first location with an accuracy less than the predetermined accuracy threshold, the computer implemented method further comprises:
   determining user authentication via one or more additional authentication methods or factors;
   granting the user access to the protected network, if the one or more additional authentication methods or factors successfully authenticate the user; and
   denying the user access to the protected network, if the one or more additional authentication methods or factors fail to authenticate the user.

24. The computer implemented method as recited in claim 21, if the one or more additional authentication methods or factors successfully authenticate the user, the computer implemented method further comprises:
   logging the user into the protected network; and
   opening one or more of the user's frequently used applications.

25. A computer implemented method, comprising:
   receiving a notification of user login from an information handling system (IHS) located at a first location when a user initiates login to a protected network from the IHS;
   collecting data from the IHS and one or more trusted devices located within the first location, wherein the collected data comprises system and user-related data;
   adding the collected data to user profile data previously stored within a training dataset; and
   using the collected data and the user profile data previously stored within the training dataset to securely authenticate the user or detect potential security threats to the protected network;
   wherein said using the collected data and the user profile data previously stored within the training dataset to securely authenticate the user or detect potential security threats to the protected network comprises using the collected data and the user profile data to:
      determine if the user's login behavior is normal, and
      detect if at least one trusted device of the one or more trusted devices is in range of the IHS;
   wherein if the user's login behavior is normal and the at least one trusted device is in range of the IHS, the computer implemented method further comprises:
      authenticating the user, and
      logging the user into the protected network; and
   wherein if the user's login behavior is normal and the at least one trusted device is in range of the IHS, the computer implemented method further comprises:
      opening one or more of the user's frequently used applications.

* * * * *